No. 607,797. Patented July 19, 1898.
J. W. HOCKER.
BRUSH MACHINE.
(Application filed Feb. 2, 1898.)
(No Model.) 13 Sheets—Sheet 1.

WITNESSES: INVENTOR: Jno. W. Hocker
By his Attorneys

No. 607,797. Patented July 19, 1898.
J. W. HOCKER.
BRUSH MACHINE.
(Application filed Feb. 2, 1898.)
(No Model.) 13 Sheets—Sheet 2.

WITNESSES:
Arthur E. Paige
J. Norman Dixon

INVENTOR:
Jno. W. Hocker
By his Attorneys
Wm. C. Strawbridge
J. Bonsall Taylor

No. 607,797. Patented July 19, 1898.
J. W. HOCKER.
BRUSH MACHINE.
(Application filed Feb. 2, 1898.)
(No Model.) 13 Sheets—Sheet 4.

WITNESSES:
INVENTOR:

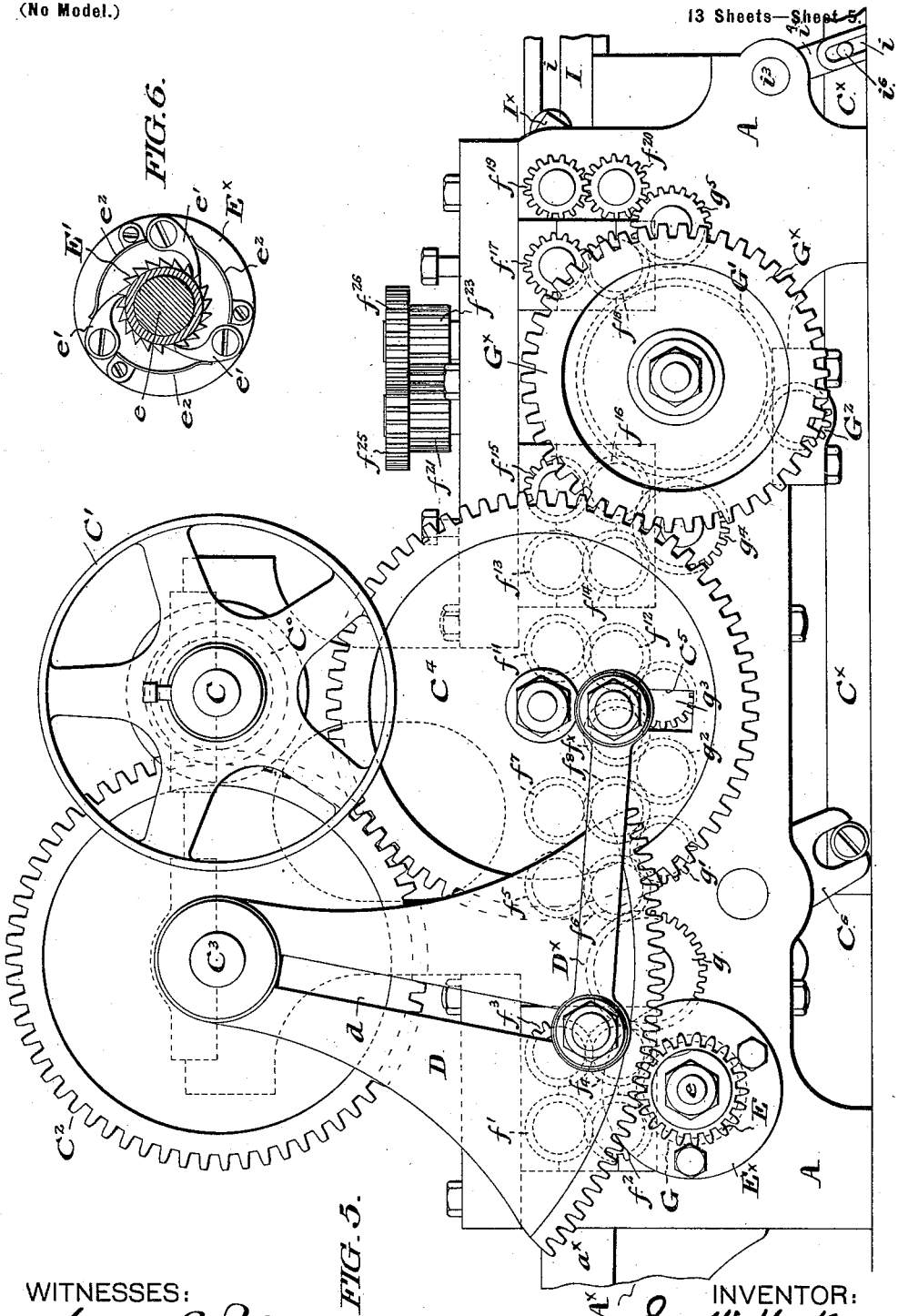

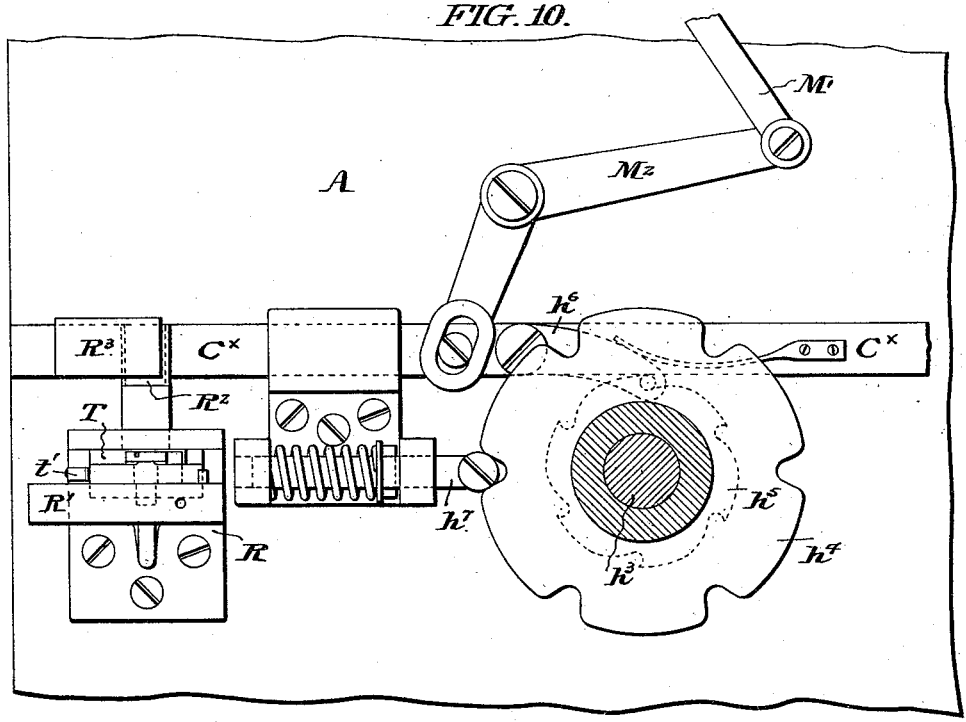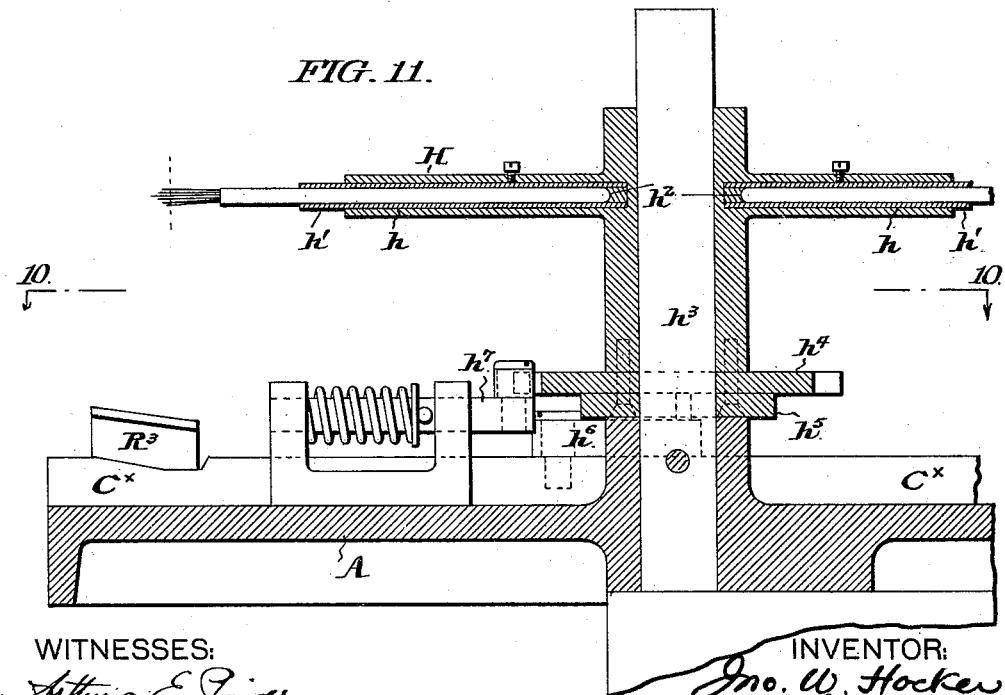

No. 607,797. Patented July 19, 1898.
J. W. HOCKER.
BRUSH MACHINE.
(Application filed Feb. 2, 1898.)
(No Model.) 13 Sheets—Sheet 7.

WITNESSES: INVENTOR:

No. 607,797. Patented July 19, 1898.
J. W. HOCKER.
BRUSH MACHINE.
(Application filed Feb. 2, 1898.)
(No Model.) 13 Sheets—Sheet 8.

FIG. 14½.

WITNESSES: INVENTOR:
Jno. W. Hocker

No. 607,797. Patented July 19, 1898.
J. W. HOCKER.
BRUSH MACHINE.
(Application filed Feb. 2, 1898.)
(No Model.) 13 Sheets—Sheet 9.

WITNESSES:

INVENTOR:

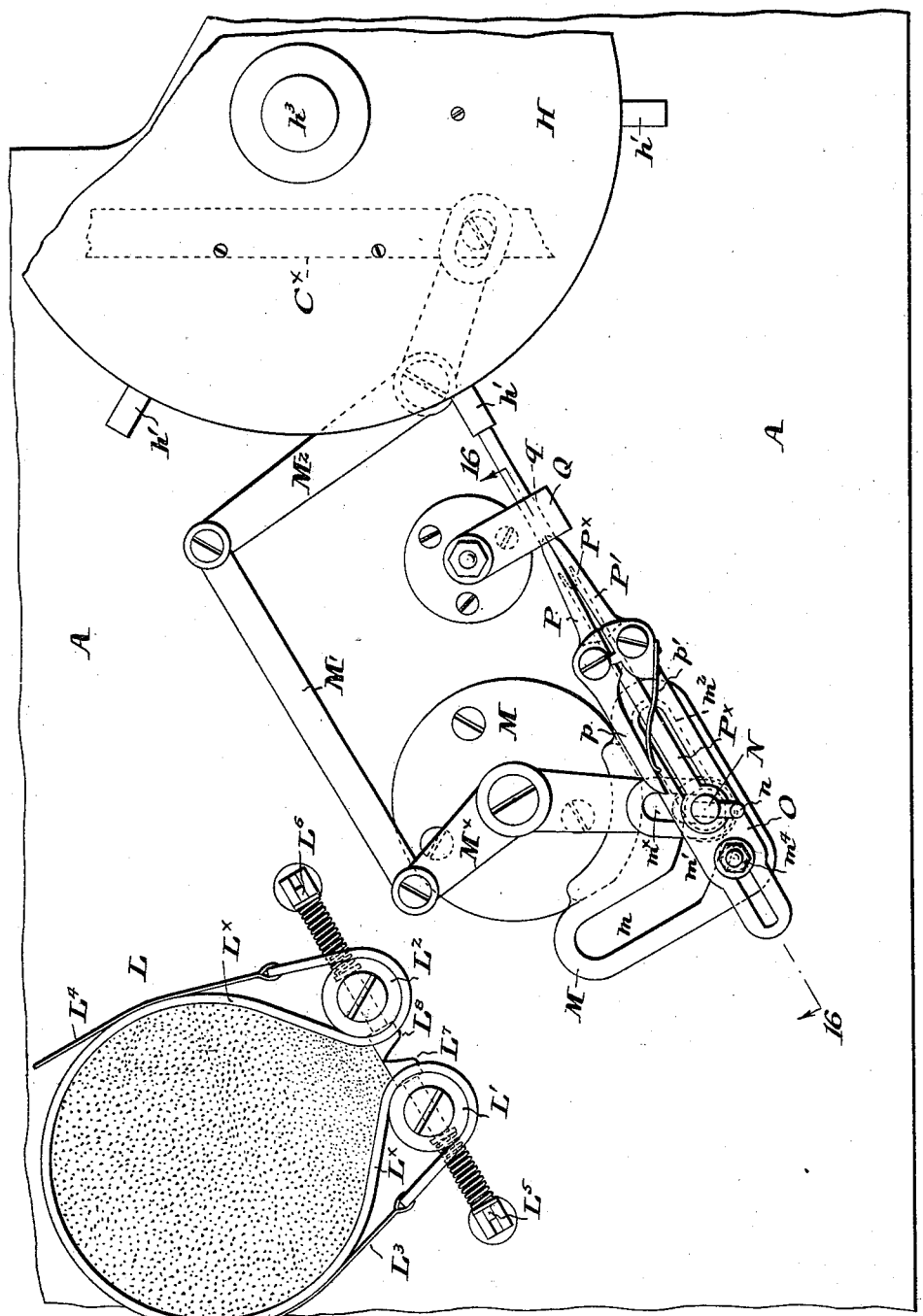

No. 607,797. Patented July 19, 1898.
J. W. HOCKER.
BRUSH MACHINE.
(Application filed Feb. 2, 1898.)

(No Model.) 13 Sheets—Sheet 11.

WITNESSES:

INVENTOR:
Jno. W. Hocker
By his Attorneys
Wm C. Strawbridge
J. Bonsall Taylor

No. 607,797. Patented July 19, 1898.
J. W. HOCKER.
BRUSH MACHINE.
(Application filed Feb. 2, 1898.)
(No Model.) 13 Sheets—Sheet 12.
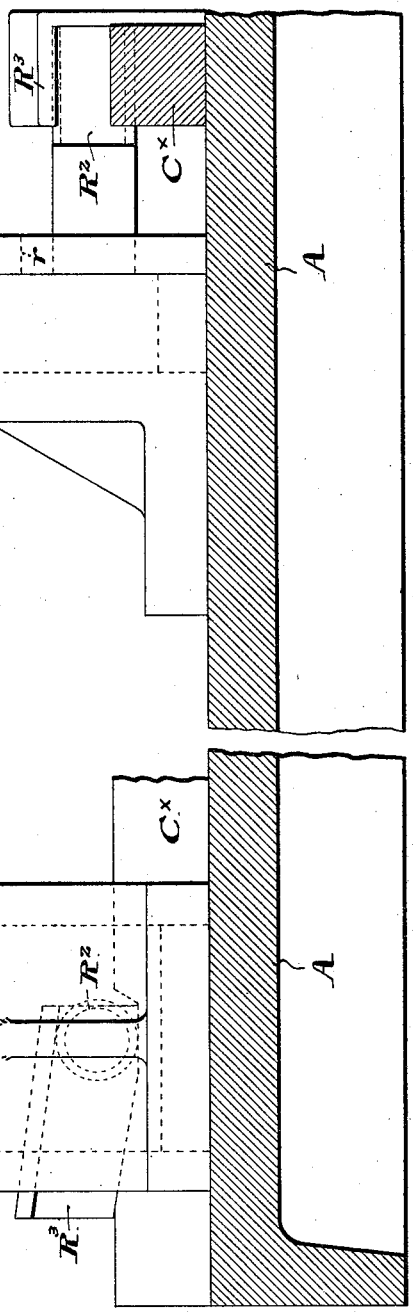
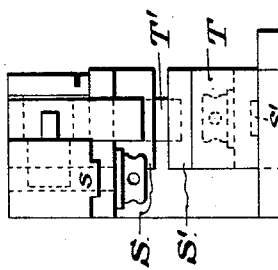
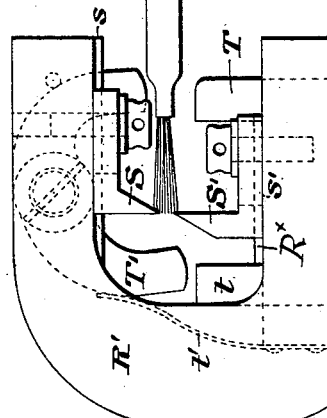
WITNESSES:
INVENTOR:

No. 607,797. Patented July 19, 1898.
J. W. HOCKER.
BRUSH MACHINE.
(Application filed Feb. 2, 1898.)
(No Model.) 13 Sheets—Sheet 13.

UNITED STATES PATENT OFFICE.

JOHN W. HOCKER, OF PHILADELPHIA, PENNSYLVANIA, ASSIGNOR OF ONE-HALF TO HARRY K. WALKER, OF FORT WASHINGTON, PENNSYLVANIA.

BRUSH-MACHINE.

SPECIFICATION forming part of Letters Patent No. 607,797, dated July 19, 1898.

Application filed February 2, 1898. Serial No. 668,817. (No model.)

*To all whom it may concern:*

Be it known that I, JOHN W. HOCKER, a citizen of the United States, residing in the city and county of Philadelphia, in the State of Pennsylvania, have invented certain new and useful Improvements in Machines for Making Brushes, of which the following is a specification.

It is the object of my invention to provide a machine for the automatic continuous and rapid manufacture of small brushes used for various purposes, but especially those of the type known as mucilage brushes, and which, as is well known, consist of tubular handles formed of sheet metal, within the bores of which are inserted tufts of bristles upon which the metal of the tube is compressed to secure them permanently in place, while upon the shanks or bodies of the handles are mounted metallic disks or caps.

Generally stated, my improved machine, considered as an entirety, in its preferred form, comprehends, first, mechanism for cutting from a sheet of metal of indeterminate area, strips of a selected width; second, mechanism for dividing such strips, as they are fed within the machine, into blanks of a suitable length; third, mechanism for forming the metal blanks into tubes; fourth, mechanism for closing one end of each of said tubes; fifth, mechanism, for forcing caps upon said tubes; sixth, mechanism for selecting from a mass of bristles contained within a suitable holder, tufts of such size as may be required for insertion within the tubes; seventh, mechanism for carrying said tufts into proximity to the tubes, and forcing them within the ends of the same; eighth, means for compressing the metal of the ends of the tubes in which the tufts are inserted upon said tufts to secure them in position; and, ninth, means for trimming the ends of the tufts,—all said mechanisms being contemporaneously operated in the running of the machine.

In the accompanying drawings, I show and herein I describe a good form of a convenient embodiment of my invention, the particular subject matter claimed as novel being hereinafter definitely specified.

In the accompanying drawings,

Figure 5 is a view in side elevation of the apparatus shown in Figure 3, sight being taken from the upper or left hand side of said figure.

Figure 6 is a view in side elevation of a ratchet disk employed as a part of my apparatus.

Figure 7 is a view in top plan of the holder for the lower member of the cutting die.

Figure 8 is a view in top plan of the lower cutting die.

Figure 9 is a view in end elevation of said lower cutting die.

Figure 10 is sectional plan of portions of the rotating carrier and its connected parts, section being supposed on the dotted line 10—10 of Figure 11.

Figure 11 is a sectional elevational view of the rotatable carrier and its associated parts.

Figure 14:
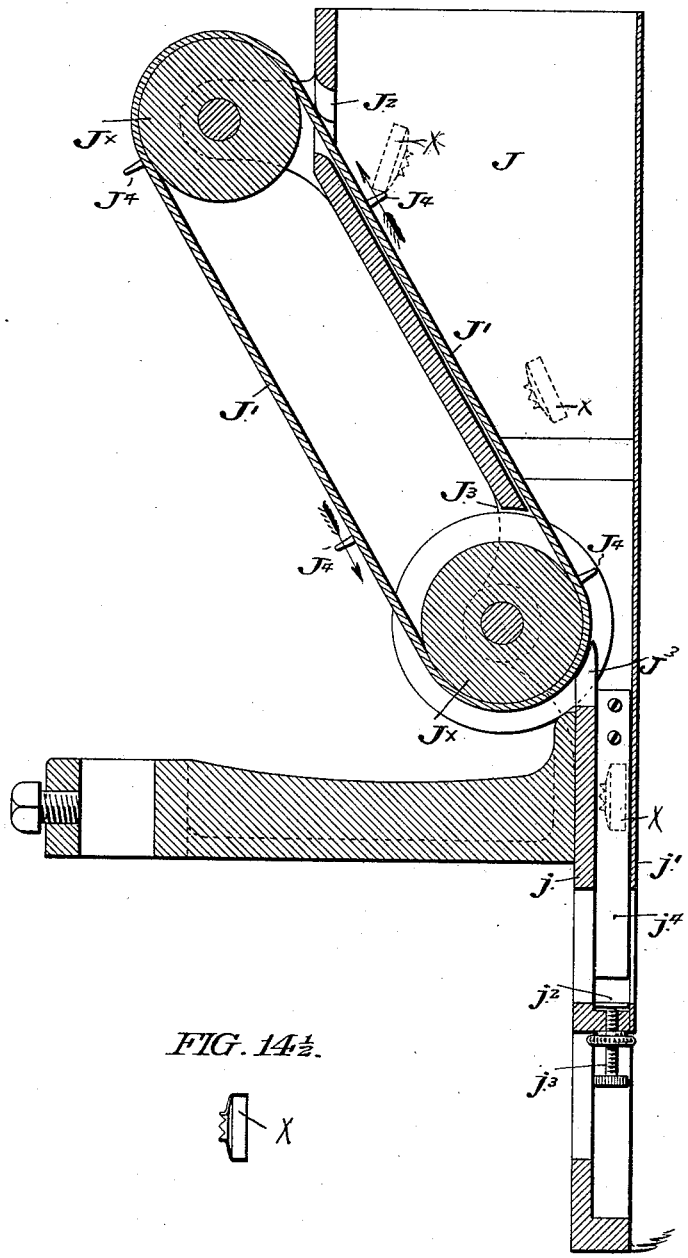
Figure 14 is a central vertical sectional elevation of the cap hopper and hopper throat.

Figure 14½ is the central sectional elevation of a form of cap employed in the construction of the brushes.

Figure 15:
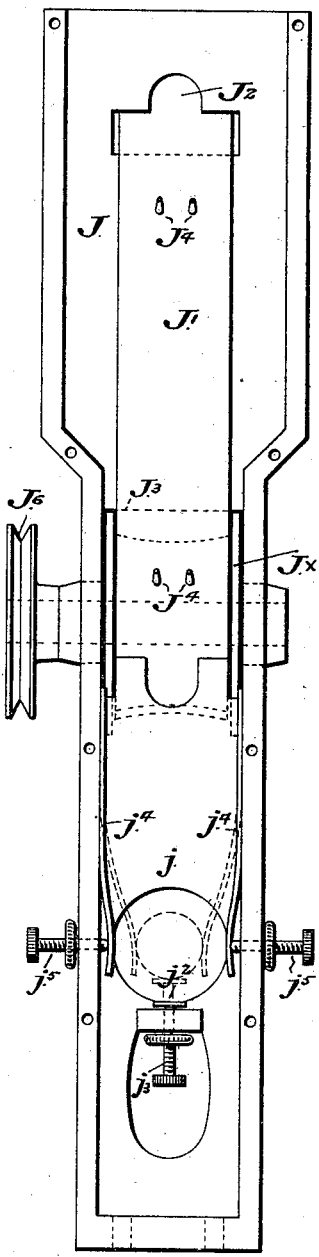

Figure 15 is a side sectional elevational view of the parts shown in Figure 14, sight being taken from the right hand side of said figure, and the wall nearest the eye being supposed removed to exhibit interior arrangement.

Figure 16:
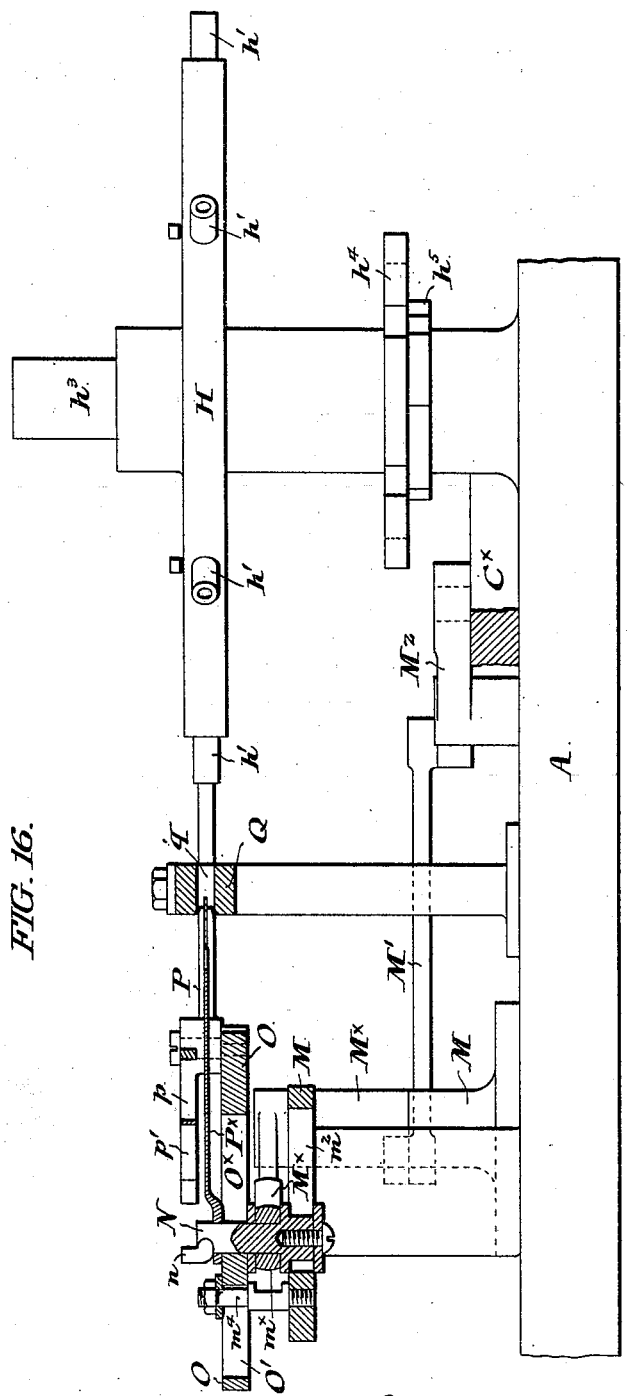

Figure 16 is a view in elevation of the rotatable carrier and parts of the tuft supplying mechanism, parts of the latter being shown in section, section being supposed taken on the dotted line 16—16 of Figure 17.

Figure 17 is a top plan view of the bristle holder and bristle supplying mechanism.

Figure 19:
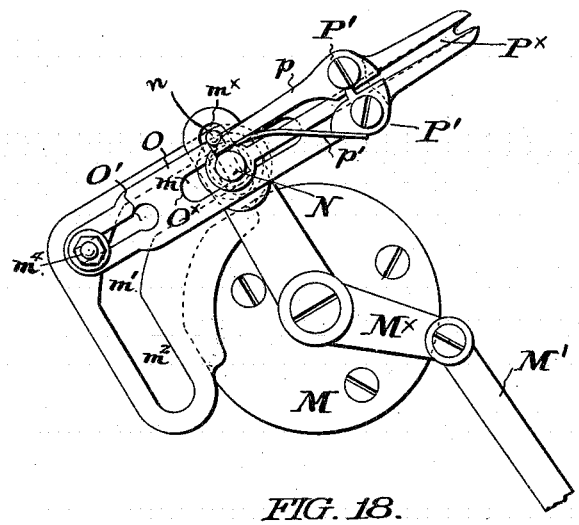
Figure 18:
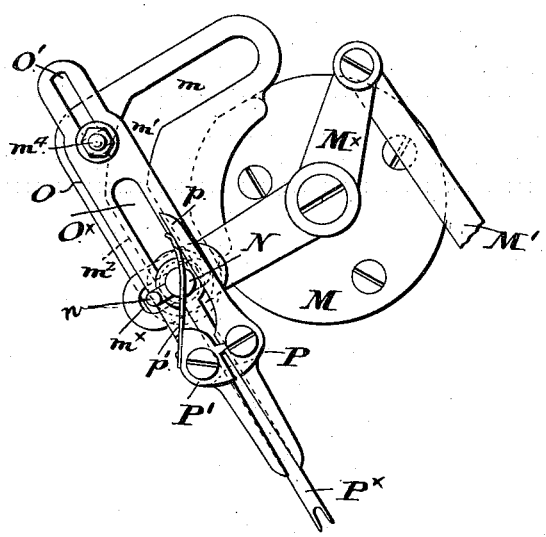

Figures 18 and 19 are top plan views of the bristle supplying mechanism, illustrating different positions of its parts.

Figures 20 and 21 are views respectively in side and front elevation, of the swaging and shearing mechanism.

Figure 22:
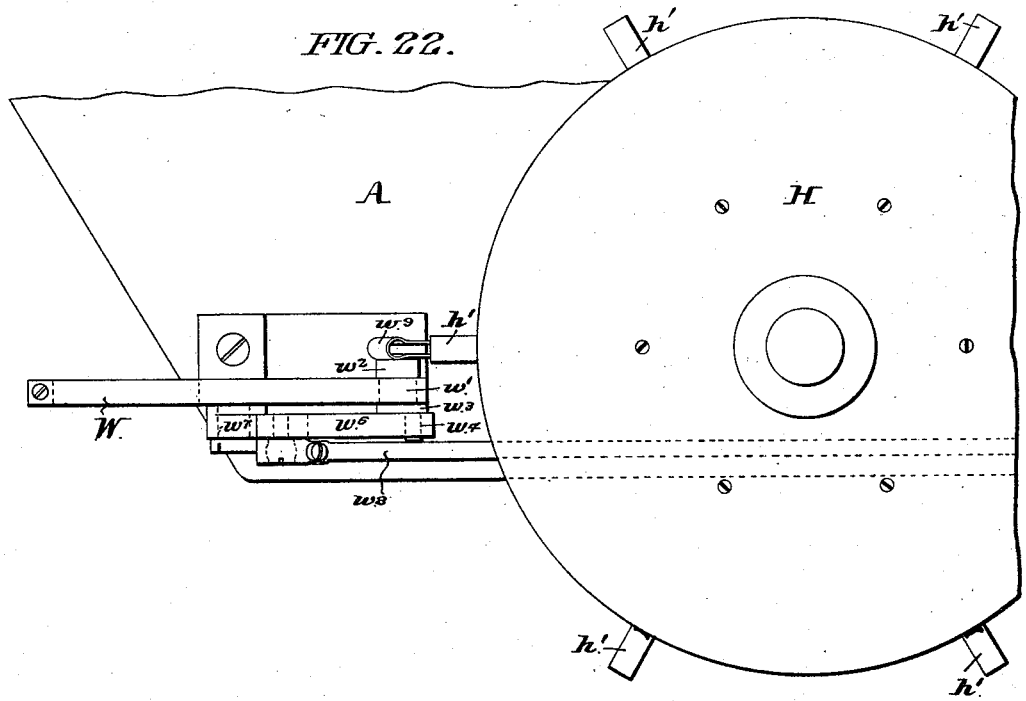
Figure 23:
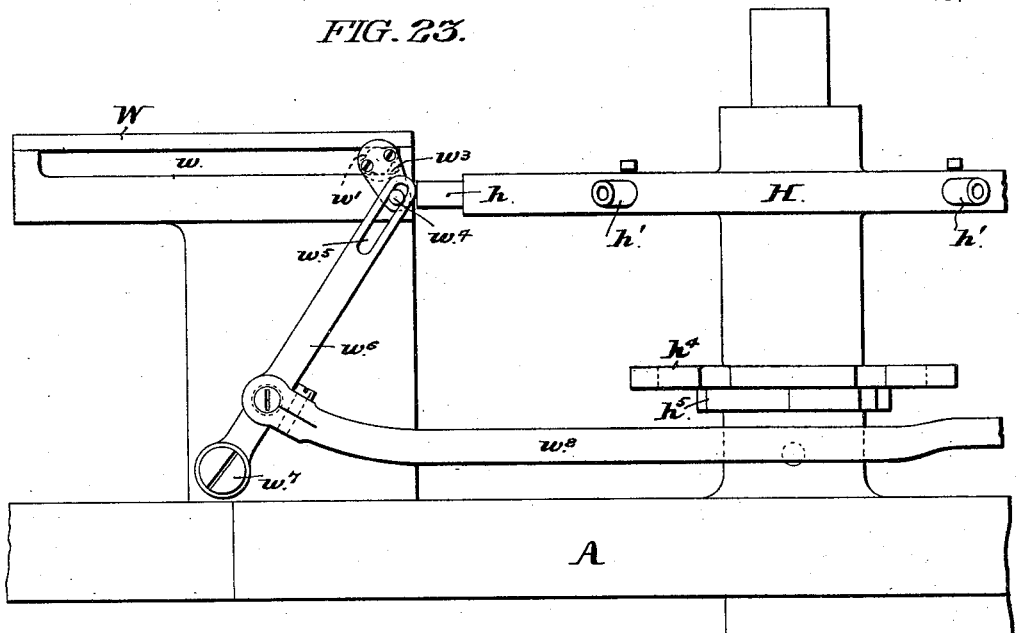

Figures 22 and 23 are respectively a top plan view and a view in side elevation of the ejecting mechanism.

Similar letters of reference indicate corresponding parts.

In the organization of my improved machine as shown in the accompanying drawings, the operative parts are mounted upon and in connection with a suitable frame work or support designated A, and which, provided it serves to support the working parts in operative position, may be of any preferred form and arrangement.

$A^\times$ is an auxiliary support, conveniently formed as a bracket secured to the main frame A in the vicinity of what I term the rear end of the machine, and upon and along this auxiliary support, which serves as a feed table, rests and travels a sheet of metal of the character employed in the manufacture of brush handle tubes.

Figure 1:
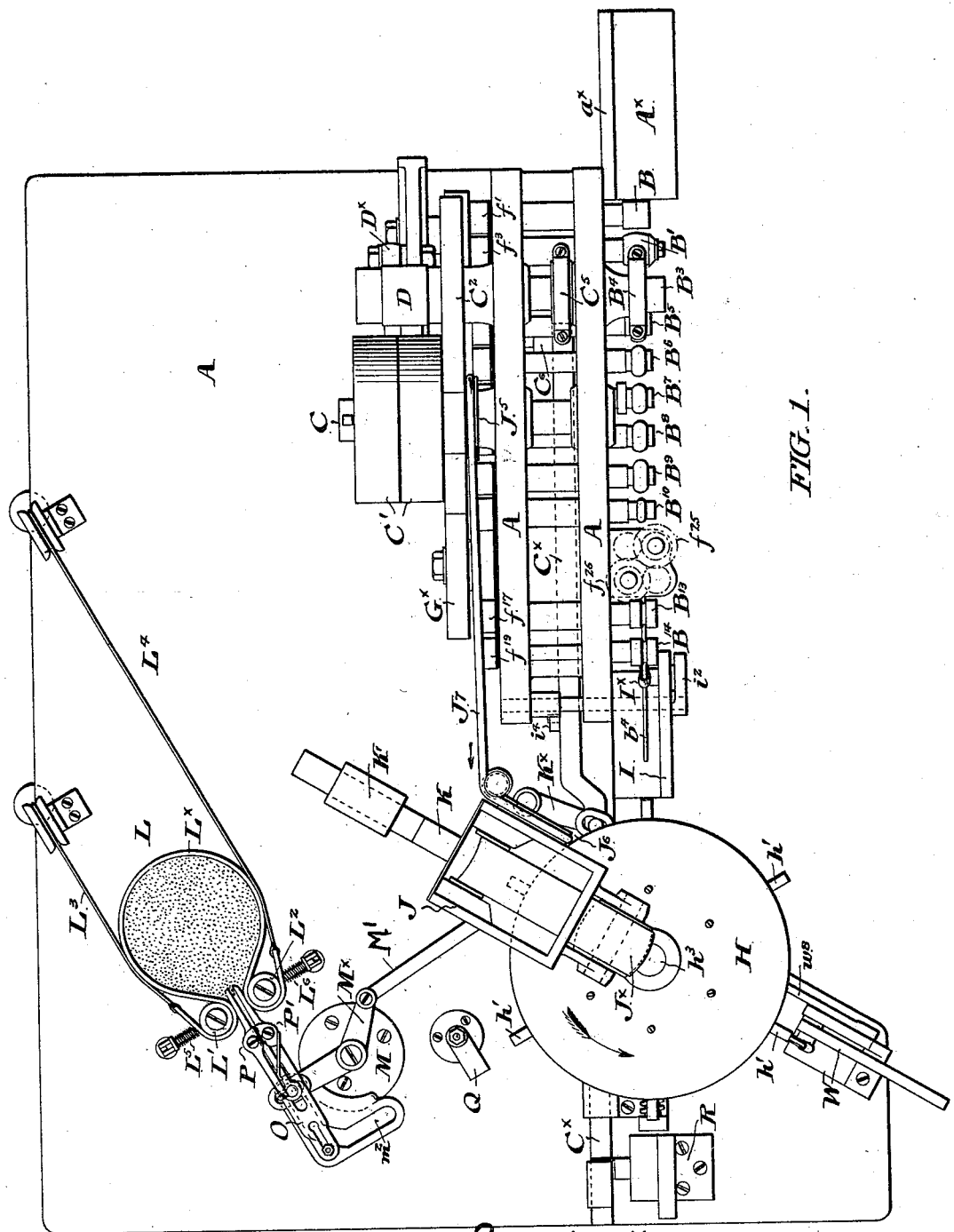
Figure 1 is a plan view of a machine embodying a good form of my invention.
Figure 2:
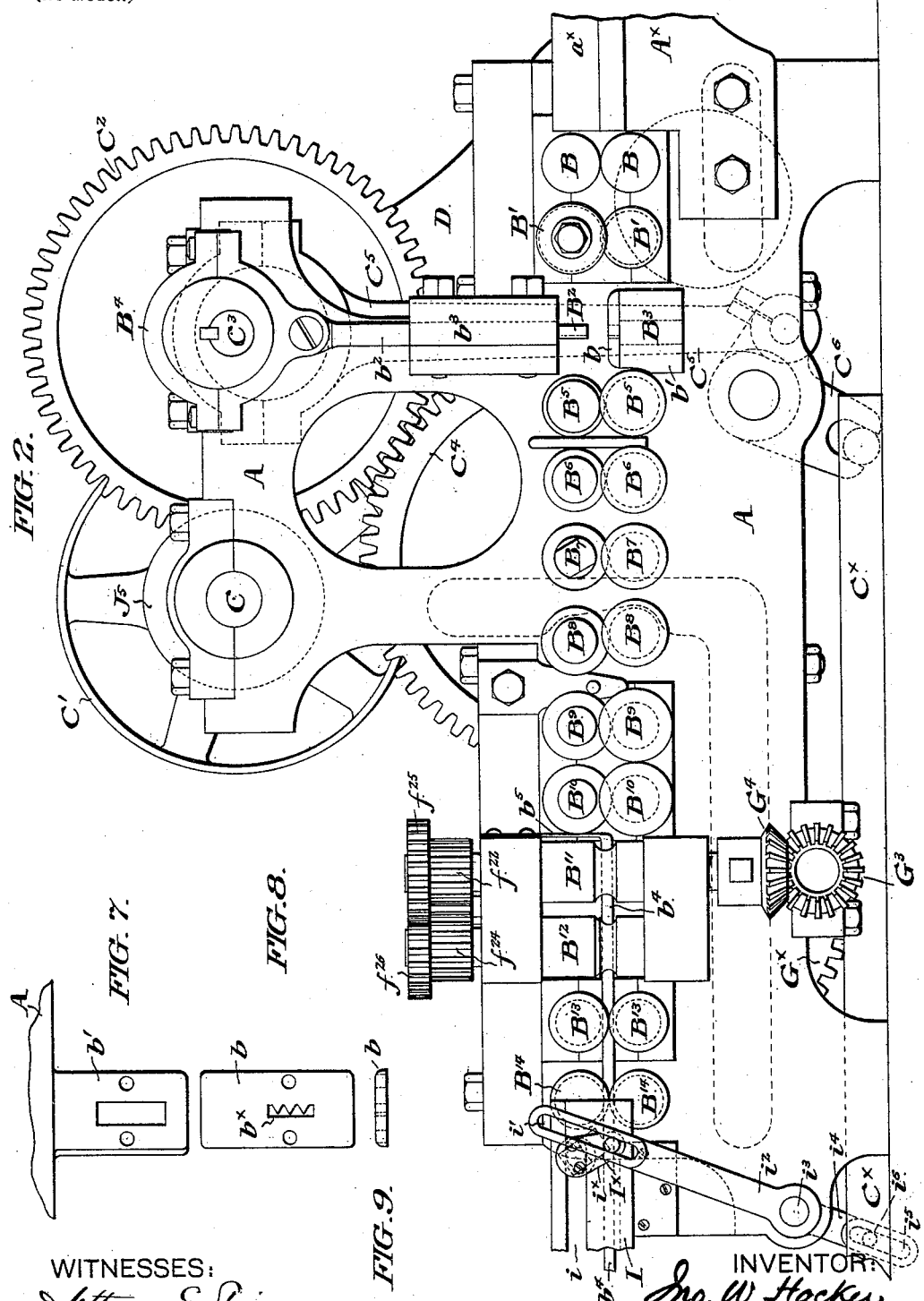
Figure 2 is a view in side elevation of that portion of the machine in which the metal cutting and tube forming instrumentalities are located, the view being taken from the lower or right hand side of Figure 3.

B B, Figures 1 and 2, are a pair of feeding rolls, supported in the frame work A in front of the auxiliary support $A^\times$, and with their pass in alinement with the upper face of said support.

B' B', Figures 1 and 2, are a pair of shearing disks supported with their edges slightly overlapping each other in the usual manner, located immediately in front of the feeding rolls, and in such position that the sheet of metal advanced from the feed table $A^\times$ toward the machine by the feeding rolls, is constantly fed between them, with the result,—the inner or right hand edge of the advancing sheet of metal being guided by the guide $a^\times$ of the feed table,—that said shears cut from the right hand edge portion of the sheet, a strip of metal, the breadth of which will be regulated by the set of said shearing disks and feed table.

The body of the sheet of metal outside of the shearing disks, from which such strip is severed, falls to the ground or is otherwise disposed of, until the rear end of the sheet passes between the shears, whereupon said sheet may be carried to the rear of the machine, placed as to its advance end upon the feeding table with its freshly cut edge against the guide $a^\times$, and may thereupon be advanced between the feed rolls and shearing disks, for the severance of another strip.

Situated just in front of the pair of shearing disks is a cutting mechanism consisting of a pair of dies, Figures 2, 7, 8, and 9, the upper of which is designated $B^2$ and the lower $B^3$.

The lower die, which is stationary, consists of a plate of metal $b$ of the form shown in Figure 8, mounted upon a support $b'$ conveniently of the character shown in Figure 7, said support being preferably formed as a bracket projecting from the body of the framework.

The upper die, $B^2$, is as to its acting face of the same outline as the opening $b^\times$ in the plate $b$ of the lower die, and is mounted upon the lower end of a die carrying plunger $b^2$ adapted to have vertical movement toward and from said lower die, and guided in its movements by its engagement in a guide sleeve $b^3$ shown especially in Figure 2.

The upper die is actuated by means described hereinafter to come into acting contact with the lower die, across the upper face of which the strip of tin severed from the body of the main sheet by the shearing disks travels,—at such intervals as will sever the traveling strip into blanks or sections of predetermined length.

The form of the dies is as illustrated such that at each descent of the upper die, the strip is completely severed, said die acting to cut from the strip in severing it, a small section of the same outline as the opening $b^\times$ in the lower die, with the result that the blanks into which the strip is divided by the action of the dies, are as to their advance ends provided with serrated edges and as to their rear ends with straight edges.

$B^5 B^5$, $B^6 B^6$, $B^7 B^7$, $B^8 B^8$, $B^9 B^9$, $B^{10} B^{10}$, $B^{11} B^{11}$, $B^{12} B^{12}$, and $B^{13} B^{13}$, are pairs of tube forming rolls, shown especially in Figure 2, and arranged in line with each other and with the cutting mechanism referred to, which rolls receive the metal blanks into which the cutting dies divide the strip of metal, and, by their successive or progressive action upon them form them into tubes.

The rolls $B^5 B^5$ receive the blanks one at a time from the cutting dies, and, as said blanks pass through said rolls, they are slightly bent or guttered and passed on to the dies $B^6 B^6$, which slightly increase the guttering or bending of the blank, as do also in succession the dies $B^7 B^8 B^9 B^{10}$, through which in succession said blanks pass.

The blanks, as they emerge from the rolls $B^{10}$, have a cross section approximately U-shaped.

The axes of the rolls of the pairs $B^5$, $B^6$, $B^7$, $B^8$, $B^9$, $B^{10}$ are, as shown in the drawings, horizontally disposed; the rolls $B^{11}$ and $B^{12}$, between which the blanks as they emerge from the rolls $B^{10}$ pass in succession, are, however, vertically disposed, and through the passes of said rolls, as well as through the pass of the rolls $B^{13}$ which passes are all in alinement with the passes of the rolls $B^5$—$B^{10}$,—extends a mandrel, $b^4$, supported by a depending arm $b^5$, the upper end of which is secured to the main frame A.

The U-shaped blanks as they progress from the rolls $B^{10} B^{10}$ to the rolls $B^{11} B^{11}$ are not interfered with by the supporting arm $b^5$ of the mandrel $b^4$ inasmuch as the edges of the blanks pass along on the opposite sides of said supporting arm.

The U-shaped blanks are, as they progress through the pass of the rolls $B^{11}$ $B^{12}$ reduced to their final form, that is to say their edges are bent down upon the upper face of the mandrel and caused to overlap each other, so that the blank assumes the form of a complete tube.

As the blanks, which may now be termed tubes, emerge from the pass of the rolls $B^{12}$, they are taken within the pass of the rolls $B^{13}$, the axes of which are horizontally disposed, and the upper member of which last mentioned pair, by travel upon the overlapped edges of said tubes, fixes said overlapped edges very firmly in position, and completes the formation of the tube.

Said rolls $B^{13}$, as they act upon the tubes, also force them along the mandrel, $b^4$, and within the pass of a pair of horizontally disposed delivery rolls $B^{14}$ $B^{14}$ in alinement with the other rolls hereinbefore referred to, and from which delivery rolls the tubes are carried by a conveyer, whereof hereinafter, to the rotatable carrier.

It is of course to be understood, that the passes of the successive rolls $B^5$, $B^6$, $B^7$, $B^8$, $B^9$, $B^{10}$, $B^{11}$, $B^{12}$, $B^{13}$, are as hereinbefore explained, of such form as to effect the bending of the blank to the form of a tube, and that rolls adapted to accomplish this purpose by successive action of their passes upon blanks of metal are not in themselves novel with me, and, that therefore I do not herein illustrate with great precision the exact construction of such rolls or the precise forms of their successive passes.

Obviously, my improved machine may be constructed with a less number or a greater number of blank shaping rolls than the number indicated, and obviously also the rolls which transform the blank into a tube may be differently disposed and arranged without departure from the spirit of my invention, the arrangement illustrated being merely one well adapted to carry out the objects of my invention.

Of course the precise arrangement of driving gear through which from a main driving shaft power is transmitted to the rolls already described, is a matter within the province of the constructor and does not form an essential part of my invention.

Conveniently however, the mechanism shown in the drawings and which I now proceed to describe may be resorted to.

I prefer to so organize the machine that the shaping rolls $B^9$, $B^{10}$, $B^{11}$, $B^{12}$, $B^{13}$, and the delivery rolls $B^{14}$ shall all be constant in their movement, but that the feeding rolls the shearing disks, and the shaping rolls, $B^5$, $B^6$, $B^7$, and $B^8$, shall all operate intermittently in periods timed with relation to the movement of the reciprocating upper member of the pair of cutting dies.

Figure 3:
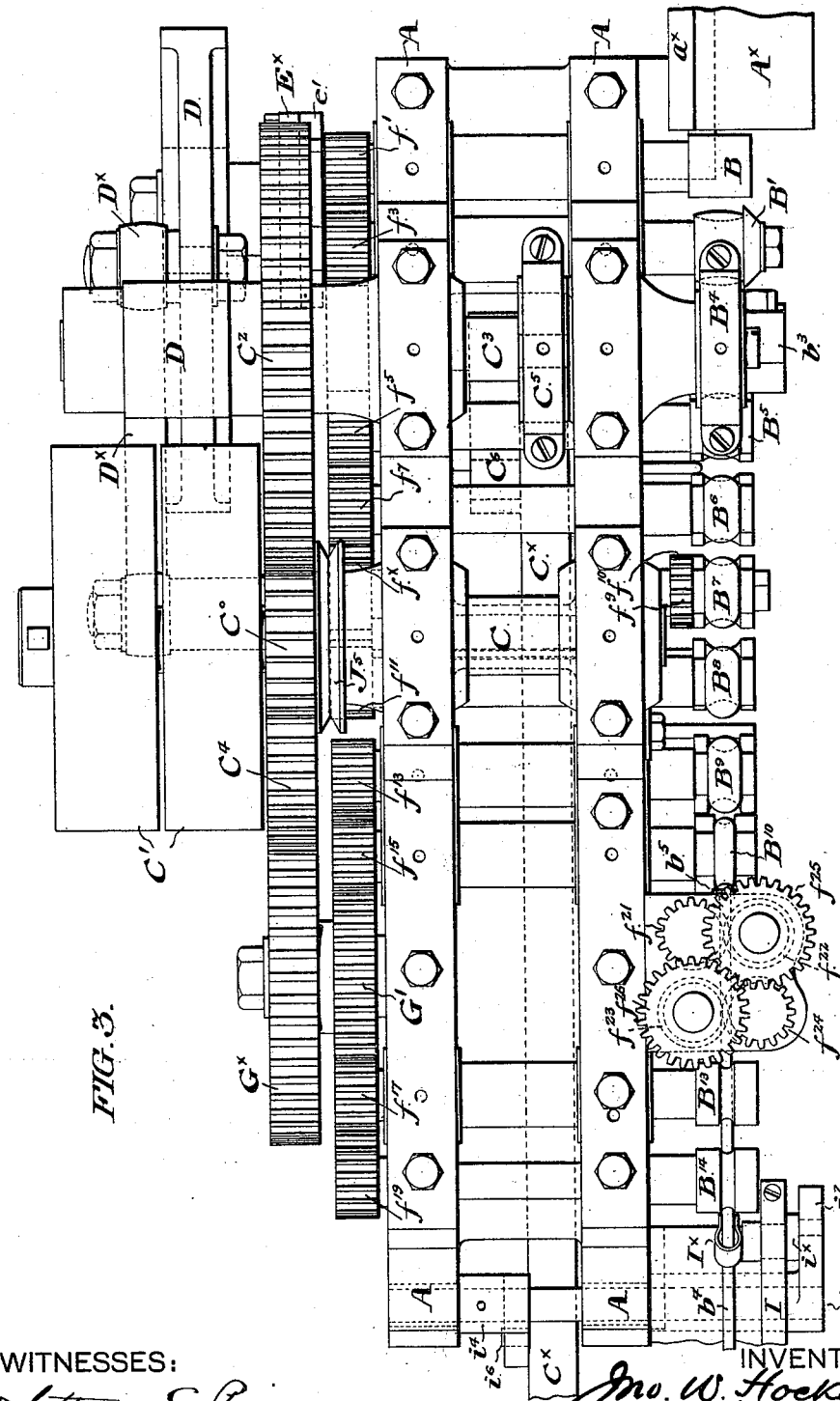
Figure 3 is a top plan view of that portion of the machine in which the metal-cutting and tube-forming instrumentalities are located.

C, Figures 2, 3, and 5, is the main driving shaft supposed operated by any suitable and convenient motor mechanism, mounted in bearings located in the upper portion of the framework of the machine, equipped with the fast and loose driving pulleys $C'$ and a driving gear $C^0$ mounted in mesh with an idle gear $C^2$ mounted on a shaft $C^3$ supported in suitable bearings in the main frame A, which idle gear in turn meshes with a gear $C^4$ (see Fig. 5), which drives the feed rolls the shearing disks and the forming and delivery rolls hereinbefore referred to,—one train of gearing operated by said wheel $C^4$ driving the rolls $B^9$, $B^{10}$, $B^{11}$, $B^{12}$, $B^{13}$, and $B^{14}$, with a constant movement, and the other train driving the feed rolls, the shearing disks, and the forming rolls $B^5$, $B^6$, $B^7$, and $B^8$, with an intermittent movement, as hereinbefore referred to.

D is a toothed sector loosely mounted upon or depending from the shaft $C^3$ with relation to which it is adapted to have a pendulous motion, and $D^\times$ is a link connective of the wheel $C^4$ and said sector, and through which said wheel $C^4$ operates to positively oscillate said sector on its axis of movement.

The link $D^\times$ is provided as to one end with a wrist-pin entered within a slot $d$ formed in the toothed sector D and extending radially from its axis, and is provided as to its other end with a corresponding wrist-pin engaged in a radial slot $C^5$ formed in said wheel $C^4$.

By means of the wrist-pins referred to the extremities of the link may be secured in such positions with respect to the lengths of the slots $d$ $C^5$ as will occasion the required throw of the toothed sector.

Figure 4:
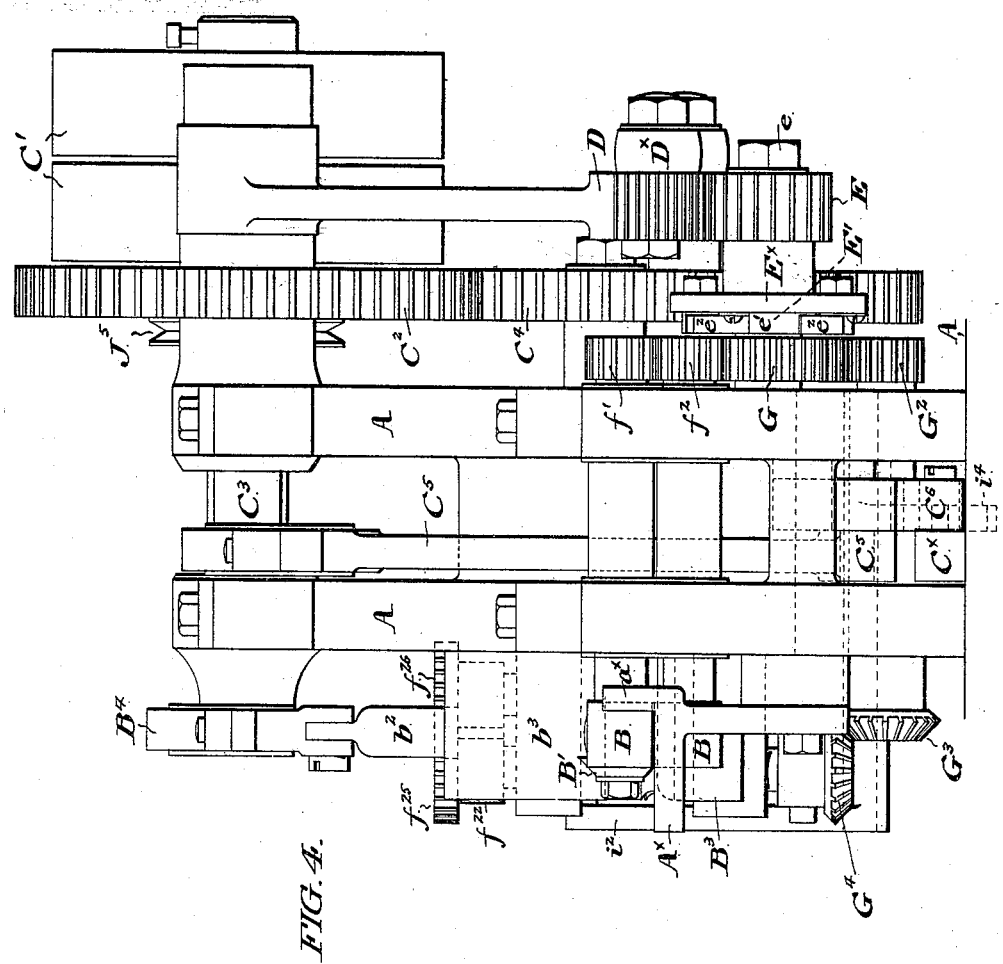
Figure 4 is a view in end elevation of the apparatus shown in Figure 2, sight being taken from the right hand end of said figure.

The teeth of the face of the toothed sector D are in constant engagement, see Figures 4, 5, and 6, with the teeth of a circular rack E mounted upon a sleeve which also carries a ratchet disk $E^\times$ said sleeve being loosely mounted upon a shaft $e$ in the vicinity of a ratchet $E'$ affixed to said shaft, said disk having one or more pawls $e'$ normally held in engagement with the teeth of said ratchet by springs $e^2$, as shown especially in Figure 6.

As will now be understood, movement of the toothed sector in either direction occasions corresponding movement of the ratchet disk, said ratchet disk however when moved in one direction being without effect upon its shaft $e$, its pawls slipping idly past the ratchet-teeth, but when moved in the opposite direction effecting the engagement of the pawls with the ratchet, and the positive driving of said shaft.

The inner ends of the axles of the feed rolls are each equipped with toothed wheels in mesh with each other and designated $f'$ $f^2$, while the inner ends of the axles of the shearing disks are similarly equipped with intermeshed toothed wheels designated respectively $f^3$ $f^4$ (see Fig. 5.)

The inner ends of the axles of the shaping rolls $B^5$ are similarly provided with intermeshed toothed wheels $f^5 f^6$; the inner ends of the axles of the shaping-rolls $B^6$ are similarly provided with intermeshed tooth wheels $f^7 f^8$, the axles of the shaping rolls $B^7$ are similarly provided upon the opposite side of the frame with intermeshed toothed wheels designated respectively $f^9 f^{10}$, (see Fig. 3) the inner end of the lower axle being also provided with a toothed wheel $f^x$, the inner ends of the axles of the shaping rolls $B^8$ are similarly provided with intermeshed toothed wheels designated respectively $f^{11} f^{12}$.

G, Figures 4 and 5, is a driving wheel affixed to the shaft upon which the ratchet-disk is mounted, and directly in gear with the toothed wheels $f^2$ and $f^4$, and in gear through the idler $g$ with the toothed wheel $f^6$ which toothed wheel $f^6$ is through the intermediate idle wheel $g'$ in gear with the toothed wheel $f^8$.

Said toothed wheel $f^8$ is through an intermediate idler $g^2$ in gear with the toothed wheel $f^x$, the motion of which is through the idler $g^3$ transmitted to the toothed wheel $f^{12}$.

As a result of this arrangement as will be obvious, the intermittent forward motion imparted to the shaft $e$ through the toothed sector, and ratchet disk, will be transmitted to the feeding rolls, the shearing disks, and the shaping rolls $B^5$, $B^6$, $B^7$, and $B^8$, with the result that all said instrumentalities will be operated to intermittent movement in absolute unison.

The inner ends of the axles of the shaping rolls $B^9$ are provided with intermeshed toothed wheels $f^{13} f^{14}$, the inner ends of the axles of the shaping rolls $B^{10}$ are provided with intermeshed toothed wheels $f^{15} f^{16}$; the inner ends of the axles of the shaping rolls $B^{13}$ are provided with intermeshed toothed wheels $f^{17} f^{18}$; while the inner ends of the axles of the delivery rolls $B^{14}$ are provided with intermeshed toothed wheels $f^{19} f^{20}$.

The upper ends of the axles of the rolls $B^{11}$ (see Figs. 3 and 5) are provided with intermeshed toothed wheels $f^{21} f^{22}$ and the upper ends of the axles of the shaping rolls $B^{12}$ are provided with intermeshed gear wheels $f^{23} f^{24}$.

The axle of one of the rolls $B^{11}$ is provided with a gear $f^{25}$ in mesh with a gear $f^{26}$ on the axle of one of the rolls $B^{12}$.

The wheel $G^x$ is in mesh with the wheel $C^4$ and on the same shaft with said wheel $G^x$ is mounted a smaller toothed wheel $G'$, said wheel $G'$ (see Figs. 3 and 5) being in mesh with the toothed gears $f^{16} f^{18}$, and in mesh through the idler $g^4$ with the toothed wheel $f^{14}$ and through the idler $g^5$ with the toothed wheel $f^{20}$.

$G^2$, is a gear wheel mounted on a shaft extending transversely of the framework, and in mesh with said toothed wheel $G'$, Figures 2, 3, and 5, the other end of said shaft being equipped with a bevel gear $G^3$ engaged with a corresponding bevel gear $G^4$, mounted on the lower end of the axle of the outer member of the pair of rolls $B^{11}$.

As a result of the arrangement described the rolls $B^9 B^{10}$, $B^{11}$, $B^{12}$, $B^{13}$, and $B^{14}$, will all be constantly operated in a common direction at an equal speed.

The upper die of the strip cutting mechanism is as stated mounted upon a die carrying plunger $b^2$.

Motion of reciprocation is imparted to this plunger through an eccentric, mounted upon the shaft $C^3$, about which is passed the eccentric strap $B^4$ connected to the upper end of said plunger $b^2$.

$C^x$ is a reciprocating driver, operated from the main shaft, and serving to impart motion to several operative instrumentalities forming part of the machine, whereof hereinafter.

Motion is conveniently imparted to this reciprocating driver through a plunger $C^5$, Figure 2, mounted and arranged for vertical reciprocation, and connected to said driver through a bell-crank lever $C^6$.

The upper end of said plunger is provided with an eccentric strap which is engaged with an eccentric mounted on the shaft $C^3$.

Description has now been given of the instrumentalities employed in the manufacture of the metal tubes.

In the organization of my invention illustrated in the drawings, a movable holder or rotatable carrier is employed to present the tubes one by one to each of the instrumentalities employed in the manufacture of the brush.

The said rotatable carrier, designated H, is shown as consisting of a rotatable disk provided with a series of radial recesses $h$ each adapted to receive one of the tubes, said disk being associated with driving mechanism, whereby its predetermined intermittent rotation is effected.

I, Figure 2, is a guide plate which extends from the vicinity of the delivery rolls to the vicinity of the periphery of the rotatable carrier, and is provided with a horizontal slot $i$ extending almost from end to end of the same.

A conveyer is mounted in said slot and is adapted to travel from end to end of the same, and convey the tubes one by one, from the delivery rolls to the rotatable carrier, said conveyer being best shown in Figures 2 and 3. The arrangement of the conveyer to which I prefer to resort is as follows:.

A conveyer stud shaft extends through the slot $i$ and is provided with a head which travels along the inside face of the plate I and a crank plate $i^x$ which travels along the exterior face of the plate I and is provided with a wrist-pin which is entered in an elongated slot $i'$, in a rock-arm $i^2$, mounted upon a rock-shaft $i^3$, journaled in the frame-work of the machine and rocked through the medium of an actuating arm $i^4$, (see Figure 2) extending down into the vicinity of the reciprocating driver $C^x$ and provided with an elongated slot, $i^5$, in which a pin $i^6$ on said reciprocating driver is entered.

$I^x$ are a pair of spring fingers conveniently formed as shown in Figure 3, of a strip of sheet metal bent to an approximately U-shaped form, and the extremities of which are normally set together a distance slightly less than the diameter of the tubes, said spring fingers being mounted upon the inner end of the conveyer stud shaft, in line with and in close proximity to the pass of the delivery rolls.

In the normal position of the parts, being that illustrated in Figure 2, the spring fingers are so situated that a tube emerging from the pass of the delivery rolls will travel just beneath their extremities,—and in the operation of the machine the advance end of said tube will arrive beneath said fingers, just as, in the timing of the machine, the reciprocating driver $C^\times$ starts in its movement to the right, (Figure 2.)

The movement of the reciprocating driver to the right will occasion the movement of the rock arm on the rock shaft as a fulcrum, and the right hand edge, Figure 2, of the slot $i'$ bearing against the wrist-pin of the crank plate $i^\times$, will slightly deflect said crank downward, occasioning a corresponding descent or deflection of the spring fingers, $I^\times$, forcing them down upon either side of the tube.

In the continued movement of the reciprocating driver to the right, the rock arm will, in its corresponding movement, through its engagement with the wrist-pin, draw the stud-shaft, with its associated parts, along the slot $i$ of the plate I, without further axial movement of said stud shaft, so that the tube will be carried along in a horizontal position until its advance end is entered in a socket $h$ of the rotatable carrier.

When the carrier has traveled so far to the left, Fig. 2 that the advance end of the tube is inserted in said socket, the reciprocating driver has reached the limit of its throw to the right, Figure 2, and begins to move to the left, with the result that the crank plate and stud are thrown axially slightly to the right or upward, thus removing the spring fingers from the tube, said stud and crank plate being in the continued movement to the left of the reciprocating driver moved along the slot to the right, without further axial movement until they reach the position shown in Figure 2, in readiness, upon the movement of the reciprocating shaft to the right, to engage the succeeding tube delivered by the delivery rolls.

The rotatable carrier is as stated provided with a series of radial sockets, six of said sockets happening to be shown in the organization of my invention illustrated in the drawings.

The sockets are of large diameter, and are respectively provided with sleeves $h'$ the exteriors of which are of such size as to snugly fit within said sockets and be secured therein by retaining screws, and the bores of which are of such size as to snugly fit upon the exteriors of the tubes inserted within them.

Manifestly, by the employment of sleeves of different thicknesses, brush handle tubes of different sizes may be received, without any necessity for employing different radial carriers.

The sleeves $h'$ are equipped with shaping dies consisting of blocks $h^2$ one of which is seated in the inner end of each of said sleeves, each of said blocks having a concave face, as shown particularly in Figure 11.

Manifestly, as the handle tube is inserted in a socket, and forced inwardly under pressure, the teeth of its serrated end impinging against the curved convex face of a die, will be deflected inwardly to close the advance end of said tube.

The rotatable carrier is advanced step by step, so that an empty socket is always in position to receive a tube each time the conveyer advances to carry a tube from the delivery rolls.

The rotatable carrier, see Figures 10 and 11, is shown as provided with a hub seated upon a short vertical shaft $h^3$, to the lower end of which hub are secured a locking plate $h^4$ and a ratchet plate $h^5$.

Connected with the reciprocating driver is a pivoted pawl $h^6$ provided with a stud adapted to engage the successive teeth of said ratchet plate, and held to contact with the face of said ratchet plate by any usual spring contrivance, such as that shown in Figure 10 of the drawings, and through which pawl and ratchet the rotatable carrier is in the reciprocation of said driver $C^\times$ given an intermittent rotation.

The locking plate $h^4$ is as shown in the drawings, a disk provided with a series of rounded peripheral recesses, in which successively engages the rounded head of a radially disposed spring actuated bolt, $h^7$, the tendency of which is constantly to bear against said plate.

The engagement of the locking bolt, within said recesses, is such as to hold said locking plate and consequently the rotatable carrier quite firmly in each of its successive positions,—but by reason of the round form of the peripheral recesses, the round end of said locking bolt will, when positive motion of rotation is imparted to the structure through the ratchet, ride up the sides of said recesses against the stress of its own spring. The locking bolt thus serves to maintain the rotatable carrier in position with such firmness as overcomes any tendency of said plate to become jolted out of position in the jar and vibration of the machine, but at the same time yields when positive motion of rotation is imparted to said carrier.

The next step in the operation of the machine consists in providing each of the handle tubes with a cap X of the character ordinarily employed and such as is shown in Figure 14½ and at the same time forcing the tubes inwardly within the sockets of the rotatable crrrier with such pressure as to close their advance ends as hereinbefore described.

J, Figures 14 and 15, is a hopper situated at the point opposite which the newly inserted tubes first come to rest after their insertion in the rotatable carrier and the movement of said carrier, said hopper being constantly supplied with caps of the character illustrated. The lower end of the hopper terminates in or is equipped with a cap holder which supports said caps one by one successively in line with the handle tubes as they are successively brought to the region of said hopper, and in line also with the reciprocating cap plunger K shown particularly in Figures 12 and 13, arranged for reciprocation radially with respect to the rotatable carrier.

Figure 12:
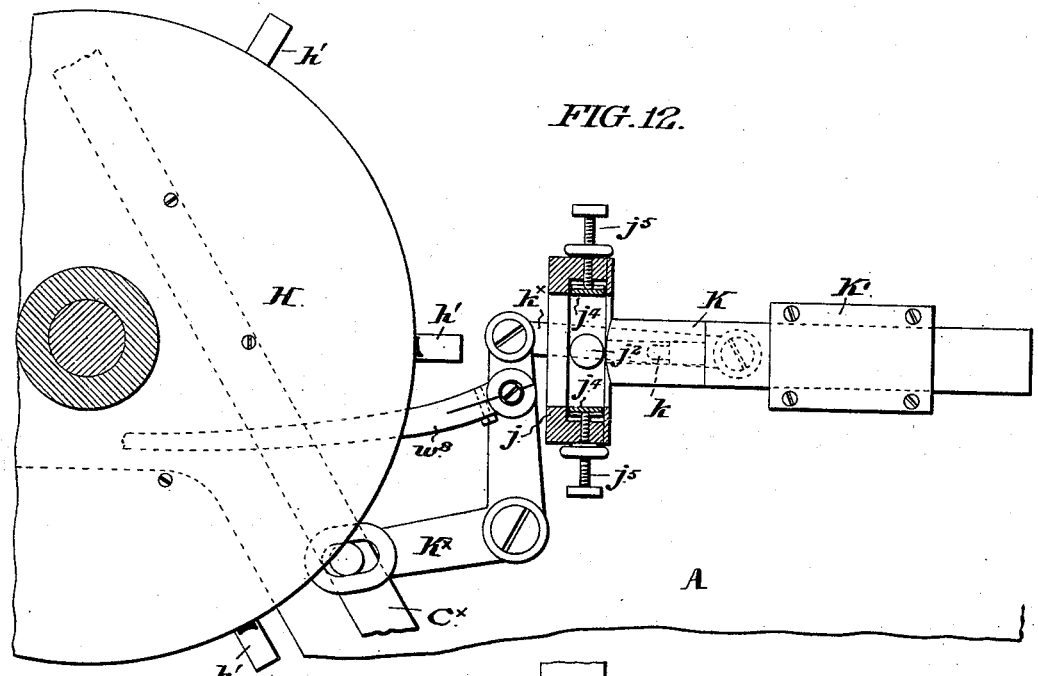
Figure 12 is a plan view of the rotatable carrier, cap plunger, and associated parts, the hopper-throat being in section.
Figure 13:
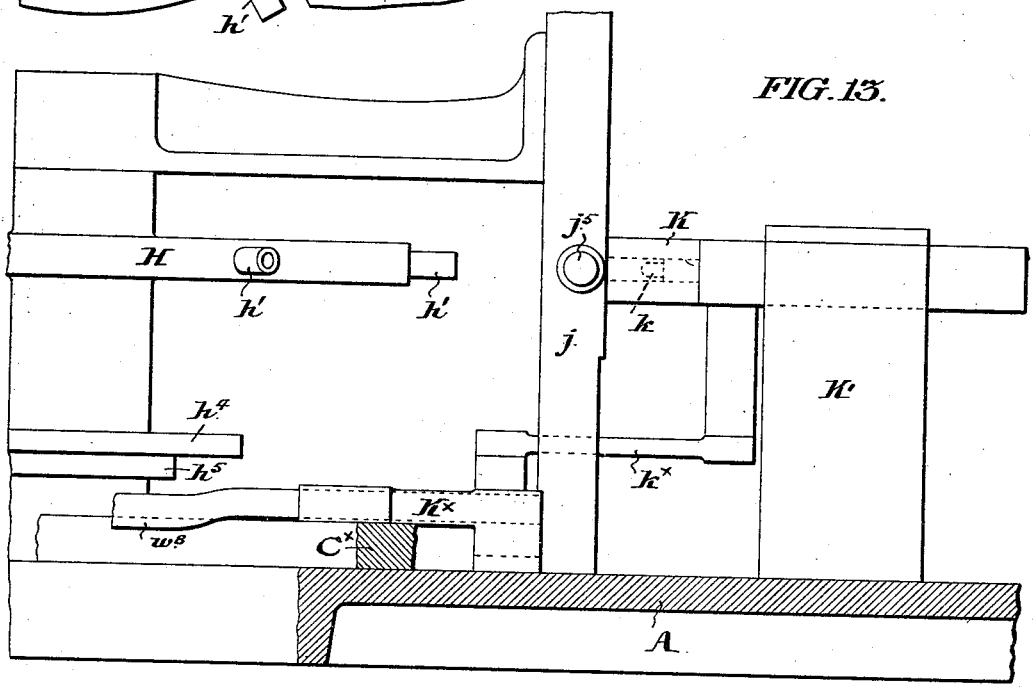
Figure 13 is a view in side elevation of the parts shown in Figure 12.

The cap holder in which the hopper terminates, supports the caps between and in axial alinement with the cap plunger on the one hand and the tube carried by the rotatable carrier on the other, with the result that as the plunger advances, it first encounters and takes up, so to speak, the cap, and in its continued movement first seats said cap upon the exterior of said tube, and finally forces said tube inwardly against the base of the socket, all as will be understood from an examination of Figure 12.

The advance end of the plunger is slightly convex, and of such diameter as to snugly fit within the peripheral flange of the cap, so that when said advance end enters within the cap supported by the holder, and carries it out of said holder, the tendency of said cap is to remain seated upon said advance end.

The plunger, is provided with an axial bore of such diameter as to receive the protruding extremity of the handle tube, and is within and at the base of said bore, provided with a mandrel $k$, which, entering the mouth of said tube, prevents it from buckling or bending under the pressure applied to the outer end of the tube by the cap plunger.

As will now be understood, the cap plunger, in its advance, receives in its bore the protruding extremity of the handle tube, with the result that the cap carried upon the end of the plunger will be seated upon the exterior of said tube, and, in continued movement of the plunger, the base of its bore encounters the outer or protruding end of the tube, and forces said tube inwardly to carry its inner end into contact with the die at the inner end of the socket, the parts being so proportioned that the advance of the plunger K is continued just far enough to seat the cap in the proper position upon the tube and to deflect the serrations or teeth at the inner end of the tube just to the proper angle.

The cap plunger may be conveniently operated through a bell crank $K^\times$ one arm of which is connected to the reciprocating driver $C^\times$, and the other connected through a link $k^\times$ with said plunger, the plunger itself being seated in a suitable housing $K'$ to secure its support and its accuracy of movement.

The cap holder shown in the drawings, consists of a structure having a throat at its lower end of such dimensions as to permit the passage of the caps one by one *seriatim;* the throat itself, which is a box-like structure, depends between the cap plunger K and the rotatable carrier, and its two side faces $j\ j'$ are provided with circular openings of diameter very slightly larger than that of the caps, and in alinement with each other and the plunger.

A web extends across the throat just below these openings, in which is seated a vertical adjustable screw $j^3$ provided with a supporting plate $j^2$ at its upper end, the arrangement being such that by the adjustment of the screw the supporting plate may be set to a position in which its upper face is in line with the lower edge of said openings.

The caps descend successively down within the throat, resting one upon another, the lowermost resting upon the supporting plate $j^2$, and in alinement with the openings in said box-throat.

The plunger reciprocates through these openings in the throat, as described, carrying away one of the caps in each of its forward movements, a new cap descending into contact with the supporting plate $j^2$ as soon as its predecessor has been thus carried away, and the plunger withdrawn.

The transverse length of the throat is slightly in excess of the breadth of the caps, to accommodate adjusting plates $j^4$ at the respective sides of the openings as shown in Figures 12, 14, and 15, which plates are adapted to be set up by suitable screws, $j^5$, so that their inner faces are in exact alinement with the respective edges of the openings.

The hopper J itself has three practically vertical walls of a permanent character, and one inclined wall, as shown particularly in Figure 14.

A pair of carrying rolls $J^\times J^\times$ fixed respectively at the upper and lower ends of the inclined wall, are provided with an apron $J'$ which travels upwardly inside said inclined wall, and downwardly outside of said wall, passing through the apron openings $J^2 J^3$, the exterior face of said apron being provided with projections or barbs $J^4$ of the character shown.

It is desired that caps shall in descending through the throat of the hopper present their concave faces toward the cap plunger, and it is the function of the barbs of this apron, in the event of caps descending to the lower portion of the hopper in a reversed position, to engage within them and carry them to the upper portion of the hopper where they will, in the agitation of the mass of caps due to their descent and the agitation imparted to them by barbs of the apron, be turned to the desired position.

The apron affords no obstruction to the descent through the throat of caps faced in the desired direction.

The hopper J is supposed full of the caps. In Figure 14 several caps are illustrated in dotted lines as in place within it.

The apron is conveniently actuated to rotation through a band or cord $J^7$, Figure 1, which is bent upon a driving band wheel $J^5$ (Figure 3) and upon a driven band wheel $J^6$, (Figure 15) mounted upon the axle of the lower apron roller, $J^\times$.

In the next succeeding rotation of the rotatable carrier, the handle tube, with its inner end closed, and with the cap seated upon it, is carried into alinement with the mechanism by which it is supplied with its tuft of bristles.

A bristle holder L is located in the vicinity of the rotatable carrier, said holder being especially shown in Figures 1 and 17 of the drawings.

As illustrated, the holder consists of a flexible wall $L^\times$ which may be formed of a leather strap or similar device, the body of which incloses the mass of bristles, resting upon their ends upon the upper surface of the bed plate of the machine, and the respective extremities of which pass about the respective members of a pair of vertically disposed rollers, $L'L^2$, located in the vicinity of each other, and constituting the mouth of the holder.

Wires $L^3 L^4$ or other flexible connections are attached to the extremities of the strap, and, running over pulleys, are secured to weights, springs or similar devices, to constantly draw the holder taut.

The rollers $L' L^2$ are mounted upon suitable studs in the respective shanks of which are openings in axial alinement in which are seated carriers, $L^5 L^6$, the opposing extremities of which are provided with lip-blocks, $L^7 L^8$, which are in contact with each other, under the stress of springs which force said carriers constantly toward each other.

The opposing faces of said blocks are slightly cut away as shown in Figure 17, to facilitate the entrance of the tuft carriers, whereof hereinafter.

M is a fixed plate having a guide slot which may be considered as consisting of three divisions $m\ m'\ m^2$, continuous of each other,—and having a vertical key stud $m^4$ rising from its upper surface.

$M^\times$ is a bell-crank lever pivotally connected to the body of said plate, or a connection thereof, one arm of which is connected to an actuating link $M'$, and the other provided with a slot $m^\times$ which intersects the guide slot referred to.

N is a stud mounted in said slot $m^\times$ of the bell-crank lever, and adapted to have movement toward and from the axis of said lever, but not free to have movement on its own axis.

This stud is provided with a finger $n$ as shown especially in Figure 16.

O is a bristle carrier plate, the same being a plate of metal having a central slot $O^\times$ through which the stud N referred to extends, and a key-slot $O'$ through which the key stud $m^4$ of the guide plate extends.

Upon the inner end of the bristle carrier plate are pivotally mounted a pair of bristle carrier fingers P P' each provided with one protruding jaw, which jaws extend beyond the bristle carrying plate and are externally tapered as shown, one of the said fingers being provided with a rigid shank, $p$, and the other with a spring-shank, $p'$, which bears against said rigid shank, and tends to keep the jaws of the device normally closed.

One of the fingers has, as shown in Figures 18 and 19, a tooth which engages in a recess in the other, whereby motion communicated to one finger is transmitted to the other, so that the two mutually approach and separate uniformly.

$P^\times$ is an ejector plate, being a plate of metal, the inner extremity of which is pivotally seated upon the stud N and the outer portion of which runs in suitable grooves formed in the opposing faces of the carrier fingers, the free end of said ejector plate having a V-shaped recess as shown.

The key-slot in the bristle carrier plate is of the form shown in the drawings, and the key stud $m^4$ rising from the fixed plate M, is, as to its lower portion, of oval section, its major transverse axis being of length in excess of the breadth of the body of the key-seat, with the result that the bristle carrier plate O may only move longitudinally with reference to the said stud when the major transverse axis of said stud coincide with the axis of the said key-slot, that is to say, when the parts are in the position shown in Figure 19,—said bristle carrier plate O when in other positions than that shown in Figure 19 being merely capable of rotating upon said key stud $m^4$ as an axis, the said key stud permitting such rotation when itself in position in the enlarged end of said key slot.

The bristle carrier plate and its associated devices have two limits of movement, in one of which, being that shown in Figures 17 and 18, the carrier fingers are in line with a handle tube presented by the rotatable carrier, and in the other of which, shown in Figures 1 and 19, said carrier fingers are in line with the mouth of the bristle holder.

In Figure 18, the parts are shown in the position in which they exist just after the delivery of a tuft of bristles to the mouth of a tube, and in Figure 19 in the position which they assume just as the bristle carrier fingers have received a tuft of bristles from the bristle holder.

The operation in detail is as follows:

The operating link $M'$ being caused to move to the right, Figure 18, the slotted arm of the bell-crank lever $M^\times$ is caused to travel from the left hand end of the guide slot $m\ m'\ m^2$, Figure 18, around to the vicinity of its right hand end; in this movement of the bell-crank as the stud N moves down the portion $m^2$ of the guide slot, the ejector plate $P^\times$ is drawn backward between the outer portions of the carrier jaws P P'; the stud N, in the continued movement of the bell crank, encounters the end of the slot $O^\times$ of the bristle carrier plate contemporaneously with its arrival at the region $m'$ of the guide slot, and, as the stud travels along said region $m'$ of the guide slot, it swings the bristle carrier plate to a position in which the latter is in line with the region $m$ of the guide slot as shown in Figure 19; in the continued movement of the bell-crank the stud N operates to slide the carrier plate O as a whole toward the bristle holder, until the outer end of the key slot O' is seated against the key-stud $m^4$, and, in the further continued movement of the said bell-crank, the finger $n$ of the stud N comes into contact with the shank $p$ of the carrier finger P and deflecting said shank occasions the spreading of the jaws of the bristle carrier fingers, the stud N contemporaneously forcing the ejector plate outward between said fingers, all as shown in Figure 19.

In bringing the parts to the position shown in Figure 19, the free extremities of the carrier jaws enter between the lip blocks $L^7 L^8$ at the mouth of the bristle holder, spread said blocks apart, as shown in Figure 1, and enter within the holder among the bristles, where a number of said bristles, regulated by the penetration of the jaws and the position of the ejector plate, will be received between said jaws as shown in said Figure 1.

In the return movement of the operating link and bell-crank lever, the operation of the parts will be that just described.

The movement of the stud N rearwardly through the region $m$ of the guide slot, first carries the finger $n$ out of contact with the shank $p$ of the carrier finger, thus permitting the spring $p'$ of the carrier jaws to close them together upon the bristles between the free extremities of said jaws.

In this return movement of the bell-crank, the stud N encounters the inner end of the slot $O^\times$ of the carrier plate, and forces said plate inwardly, the key-slot O' sliding along past the key-stud, $m^4$, contemporaneously the carrier plate retracts the carrier jaws from the mouth of the bristle holder, which thereupon automatically closes.

In the travel of the stud N through the region $m'$ of the guide slot the carrier plate is swung back into alinement with the region $m^2$ of said slot, and, as the bristle carrier plate assumes this position, the bristle carrier jaws are presented at one end of a bristle throat $q$ formed in a block Q. (See Figures 1, 16 and 17.)

As the stud N travels up the region $m^2$ of the guide slot, the ejector plate advances between the jaws of the carrier fingers, and, engaging by means of its V-shaped notch the central portion of the tuft of bristles, forces said central portion within and through said bristle throat $q$, the bristles being thus bent double, and within the open mouth of the tube handle which presents at the other end of said throat.

Motion is conveniently imparted to the driving link M' referred to, through a bell-crank lever $M^2$, as shown in Figure 17 of the drawings, one end of said lever being connected to said link, and the other connected to the reciprocating driver $C^\times$.

The tubes which have thus received their tufts of bristles are in the rotation of the socket disk next carried in succession to mechanism which contemporaneously trims off the ends of the tuft of bristles, thus reducing them to uniform length, and swages or flattens down the mouth of the tube about said bristles locking or binding them securely in position.

Mechanism which I find it convenient to employ for the purpose is as follows:

R Figures 20 and 21, is a fixed hollow vertical standard, having a vertical slot, $r$, see Figure 21, in one of its side walls, and equipped at its upper end with an overhanging rigid arm R' between the lower face of which, and the upper face of the standard, exists an interspace of suitable dimensions for the purpose had in view.

Within the hollow interior of the standard is placed a vertically reciprocating follower $R^\times$ of such plan as to adapt it to snugly fit within said interior, and equipped with a stud $R^2$ which projects through the vertical opening $r$ and is entered in an inclined cam-way $R^3$ formed in or on the reciprocating driver $C^\times$.

As a result of this arrangement, in the reciprocation of the driver $C^\times$ said follower will be caused to rise and fall in consonance with such reciprocation.

Upon the under face of the overhanging arm R' is secured a shears-block S having a body and a depending cutting blade, said body being provided with an under cut groove through which it is seated upon a correspondingly under-cut tongue $s$ mounted on the under face of said arm,—the said block as a result of this arrangement being adapted to be moved along the face of said arm to bring it to required positions of adjustment.

A screw passing through a slot formed in said block and into the body of the overhanging arm, serves to lock said block in position.

Upon the upper face of the follower $R^\times$ is mounted a corresponding shears-block S' having a body and an upwardly projecting blade, said block being provided on its under face with an under-cut groove by virtue of which it is seated upon a correspondingly under-cut tongue $s'$ formed on the upper face of said follower.

As a result of this arrangement, the lower shears-member is, similar to the upper, adapted to be moved to different positions of adjustment.

A screw passing through a slot formed in said block and into the body of the overhanging arm, serves to lock said block in position.

The upper face of the follower is also provided with a lower compressing jaw T adapted to be moved to different positions of adjustment, by any such devices as those described as resorted to by me in connection with the shears-blocks.

The upper compressing jaw T' is shown as a crescent shaped member pivotally attached intermediate of its length to the arm R', and so arranged that its rear end which normally projects somewhat below its front end, directly overhanging a tripping block $t$ mounted upon the upper face of the follower.

A spring $t'$, shown in figure 20, retains said upper compressing jaw ordinarily in the position shown in said figure.

The rotatable carrier in its rotation in succession presents handle tubes which it carries within the interspace, between the upper end of the standard and the lower face of the arm, with the lip of the tube in alinement between the compressing jaws and the ends of the bristles between the shears members, and, when the tube is thus held, the shears members will, in the ascent of the follower, sever the ends of the bristles, leaving them of uniform length, while the trip $t$ encountering the rear end of the compressing jaw, will tilt said jaw upon its pivot, and cause its front end to descend to meet the ascending lower compressing jaw, with the result that said jaws will compress between them the end of the tube, reducing said end to the form shown in Figure 20.

Manifestly, the shears members as well as the compressing jaws, may be adjusted to different positions to accommodate brush handle tubes of different lengths and bristles of different lengths, so that the machine may be employed in connection with brushes of various sizes and types.

In the rotation of the socket disk, the brushes, which are now complete, are carried from the shearing and swaging mechanism to the ejector mechanism, which may conveniently be of the character shown in Figures 22 and 23, of the drawings.

As shown in said figures, W is a guide plate mounted in proximity to the rotatable carrier and provided with a guide slot $w$ in which is mounted a stud $w'$ equipped within said plate with a holder plate $w^2$ and on the outer face of said plate with a crank plate $w^3$ at the free extremity of which is a wrist-pin $w^4$ entered in a slot $w^5$ at the upper end of the rock-arm $w^6$ pivotally attached at $w^7$ to any convenient portion of the framework, and connected for actuation by a link $w^8$ to the lever K×, Figure 12.

On the inner end of the stud $w'$ are mounted a pair of spring fingers $w^9$ conveniently formed of a strip of spring metal, bent to the form shown in Figure 22, and normally maintained in a position in which their tips are slightly above the outer end of a handle tube projecting from the adjacent socket of the rotatable carrier.

The operation of the device is as follows:

The link $w^8$ shown in Figure 23 being assumed to be moving toward the left, the first action of the rock-arm is to slightly deflect the crank plate thereby rotating the stud $w'$ upon its axis, and carrying the fingers down upon a handle tube so as to grasp the same between them.

In the continued movement of the link to the left, the rock-arm ceases to rotate the stud upon its axis, but carries said stud and its associated parts with the brush along the slot $w$ until the outer end of the same is reached.

When the link begins to move to the right, its first action is to slightly rotate the stud, wrist-pin, and associated parts to the right, Figure 23, upon the axis of said stud, thereby releasing the brush, and, in the continued movement of the link to the right, it carries said stud with its associated parts along said slot without further axial movement; thus restoring the parts to the position shown in Figure 23, in which they are in readiness to engage with the next succeeding brush presented to them in the movement of the rotatable carrier.

Having thus described my invention I claim and desire to secure by Letters Patent:

1. In a machine for making brushes, in combination, mechanism for forming a metallic handle tube, mechanism for inserting a tuft of bristles therein, mechanism for compressing the end of said handle tube upon said bristles and a movable holder, substantially as set forth.

2. In an organized machine for making brushes, in combination, mechanism for forming a metallic handle tube, mechanism for inserting a tuft of bristles within said tube, mechanism for compressing said tube about said bristles, mechanism for trimming the ends of said bristles and a movable holder, substantially as set forth.

3. In an organized machine for making brushes, in combination, mechanism for forming a metallic handle tube, mechanism for inserting a tuft of bristles within the said tube, mechanism for compressing the end of said tube upon said bristles, mechanism for trimming the ends of said bristles, mechanism for ejecting the brushes from the machine and a movable holder, substantially as set forth.

4. In an organized machine for making brushes, in combination, mechanism for forming a metallic handle tube, mechanism for turning in the lips at the outer end of said tube, mechanism for inserting tufts of bristles in the open ends of said tubes, mechanism for compressing the ends of the tubes about said bristles and a movable holder, substantially as set forth.

5. In an organized machine for making brushes, in combination, mechanism for forming metallic handle tubes, mechanism for mounting caps upon the exteriors of said tubes, mechanism for inserting tufts of bristles within said tubes, mechanism for compressing the ends of said tubes upon said bristles and a movable holder, substantially as set forth.

6. In an organized machine for making bristles, a rotatable holder or carrier, means for imparting rotation to said carrier, cap-supplying mechanism, bristle-supplying mechanism, a swaging mechanism, all located in the vicinity of said rotatable carrier, sockets formed in said carrier for the reception of metallic handle tubes, which, in the movement of the carrier are presented in succession to the several instrumentalities named, substantially as set forth.

7. In an organized machine for making brushes, a socket provided rotatable holder or carrier, means for imparting intermittent rotation to the same, mechanism for forming metallic tubes, and conveying them to and inserting them in said sockets, as the carrier rotates in front of said tube forming mechanism, mechanism for inserting tufts of bristles in the tubes carried by the rotatable carrier, mechanism for forcing caps upon the tubes mounted in the rotatable carrier, and mechanism for compressing the metal of the tubes upon the inserted bristle tufts, all said mechanisms being arranged about the rotatable carrier, substantially as set forth.

8. In an organized machine for forming brushes, in combination, a pair of feed rolls, a shearing mechanism, a pair of cutting dies, and a series of tube forming rolls, the arrangement being such that the mechanisms stated continuously sever strips of metal from a sheet, divide said strips into blanks and roll said blanks into tubes, substantially as set forth.

9. In an organized machine for forming mucilage brushes, in combination with a receiver, such as a socket provided rotatable carrier or holder, a series of tube forming rolls adapted to form metallic handle tubes, a pair of delivery rolls which receive the tubes one by one from the tube forming mechanism, and a conveyer, which carries said tubes one by one, from said delivery rolls to sockets of the rotatable carrier, said conveyer consisting of a pair of spring fingers carried by a stud, mounted in a slot formed in a plate extending from the delivery rolls to said rotatable carrier, a crank arm mounted on said stud and carrying a wrist-pin, and a rock-arm having a longitudinal slot, in which said wrist-pin is entered substantially as set forth.

10. In a machine for making brushes, in combination with delivery rollers, a conveyer mechanism, consisting of a slide plate having a longitudinal slot, a stud mounted in said slot free for axial and sliding movement therein, a pair of spring fingers mounted on said stud, a crank plate connected with said stud, and equipped with a wrist-pin, a rock-arm having an elongated slot embracing said wrist-pin, and means for occasioning the rocking movement of said rock-arm, substantially as set forth.

11. In an organized machine for forming brushes, in combination with a series of operative devices, a carrier or holder provided with sockets adapted to receive metallic handle tubes, and adapted to be rotated to present said tubes in succession to the operative instrumentalities, said carrier consisting of a plate provided with a series of radial openings, and mounted upon an axial shaft, and means for imparting intermittent rotation to said carrier, substantially as set forth.

12. In an organized machine for forming brushes, in combination with a series of operative devices, a carrier or holder provided with sockets adapted to receive metallic handle tubes, and adapted to be rotated to present said tubes in succession to the operative instrumentalities, said carrier consisting of a plate provided with a series of radial openings, and mounted upon an axial shaft, and means for imparting intermittent rotation to said carrier, such means consisting of a ratchet plate carried by such carrier, and a ratchet pawl engaged therewith, and connected with a reciprocating driver, substantially as set forth.

13. In an organized machine for forming brushes, in combination with a series of operative devices, a carrier or holder provided with sockets adapted to receive metallic handle tubes, and adapted to be rotated to present said tubes in succession to the operative instrumentalities, said carrier consisting of a plate provided with a series of radial openings, and mounted upon an axial shaft, means for imparting intermittent rotation to said carrier, such means consisting of a ratchet plate carried by such carrier, a ratchet pawl engaged therewith, and connected with a reciprocating driver, a plate rotating with said carrier and embodying a series of marginal recesses, a locking bolt having a rounded head, adapted for engagement in said recesses, said locking bolt being constantly pressed by a spring against said locking plate, substantially as set forth.

14. In an organized machine for forming brushes, in combination with a series of stationary brush-forming instrumentalities, a rotatable carrier or holder provided with radial sockets, removable bushings or sleeves mounted in said sockets, substantially as set forth.

15. In an organized machine for forming brushes, in combination with a series of stationary brush-forming instrumentalities, a rotatable carrier or holder provided with radial sockets, removable bushings or sleeves mounted in said sockets, and convex blocks mounted in the inner ends of said bushings or sleeves, substantially as set forth.

16. In an organized machine for making mucilage brushes, in combination, a rotatable carrier or holder provided with sockets, a stationary cap-hopper provided with a holder at its lower end, adapted to hold caps one at a time in line with a handle tube presented before it by the carrier, and means for forcing said cap out of said holder, and upon the tube, substantially as set forth.

17. In combination with a rotatable carrier or holder provided with tube sockets, a cap-hopper of tapering form terminating in a throat, and holding devices for supporting said caps one by one in said throat, a plunger adapted to carry said caps from said holder to and force them upon the tubes carried by the carrier, substantially as set forth.

18. In a machine for forming mucilage brushes, in combination, a rotatable carrier or holder embodying sockets for the reception of metallic handle tubes, means for supplying handle tubes to said sockets, a cap hopper of general tapering form terminating in a throat, embodying front and back openings of approximately the circumference of the caps, means for arresting the descent of the caps, when they come in line with said opening, such means consisting of an adjustable supporting-plate, and adjustable side plates, and a plunger adapted to force said caps out of said holder, and upon tubes mounted in the carrier, substantially as set forth.

19. In an organized machine for making mucilage brushes in combination with a device for supporting a series of handle tubes and presenting them in succession to brush forming instrumentalities, a cap-hopper, of a general tapering form, terminating in a narrow throat, of such plan as to be adapted to receive the caps edgewise one by one, and means for causing said caps to present within said throat with their edges turned outwardly, such means consisting of a traveling apron, which moves along the inner face of the inclined wall of said hopper, from a point just above said throat, and means for conveying said caps to and forcing them upon the tubes, substantially as set forth.

20. In a machine for forming mucilage brushes in combination, a rotatable tube carrier, means for holding caps, one by one in line with tubes mounted in said carrier, a plunger having a hollow bore, and adapted in its advance movement to engage within the concave side of the cap, and in the continued advance of said plunger to force said cap upon the exterior of a tube, the outer end of said tube being received within its own hollow bore, substantially as set forth.

21. In a machine for forming mucilage brushes in combination, a rotatable tube carrier or holder, means for holding caps, one by one, in line with tubes carried by said carrier, a plunger having a hollow bore, and adapted in its advance movement to engage within the concave side of a cap, and in the continued advance of said plunger to force said cap upon the exterior of a tube, the outer end of said tube being received within its own hollow bore, a mandrel in the base of said bore preventing the distortion of the metal of the tube, substantially as set forth.

22. In an organized machine for forming brushes, in combination, a rotatable tube carrier, means for imparting intermittent rotation to said carrier or holder, a bristle holder in the vicinity of which the tubes of the carrier successively present and dwell, and means for conveying tufts of bristles from said bristle holder to said tubes, substantially as set forth.

23. In an organized machine for forming brushes, in combination, a movable tube carrier or holder, means for supplying metal handle tubes, to said carrier, means for imparting intermittent rotation to said carrier, a bristle holder in the vicinity of which said tubes are successively presented and held, means for conveying a tuft of bristles from said bristle holder to said tubes, said bristle holder consisting of a flexible band, the respective extremities of which pass round guide pulleys or similar devices located in close proximity to each other, the ends of said band being controlled by weights or springs, substantially as set forth.

24. In an organized machine for forming brushes, in combination, a movable tube carrier or holder, means for imparting intermittent rotation to said carrier, a bristle holder in the vicinity of which said tubes are successively presented and held, means for conveying a tuft of bristles from said bristle holder to said tubes, said bristle holder consisting of a flexible band, the respective extremities of which pass round guide pulleys or similar devices located in close proximity to each other, the ends of said band being controlled by weights or springs, and blocks placed in the interspace between said guide pulleys and yieldingly forced together by spring pressure to close the opening between said guide pulleys, substantially as set forth.

25. In an organized machine for forming brushes, in combination, a movable tube carrier or holder, means for imparting intermittent rotation to said carrier, a bristle holder in the vicinity of which said tubes are successively presented and held, means for conveying a tuft of bristles from said bristle holder to said tubes, said bristle holder consisting of a flexible band, the respective extremities of which pass round guide pulleys or similar devices located in close proximity to each other, the ends of said band being controlled by weights or springs, and blocks placed in the interspace between said guide pulleys and yieldingly forced together by spring pressure to close the opening between said guide pulleys, the passing faces of said blocks being inclined, substantially as set forth.

26. In an organized machine for forming bristles, in combination, a movable tube carrier or holder, means for imparting intermittent rotation to said carrier, a bristle holder in the vicinity of which said tubes successively present and dwell, means for conveying tufts of bristles from said bristle holder to said tubes, said bristle holder consisting of a flexible band, the respective ends of which pass about two fixed devices located in the vicinity of each other, lip-blocks disposed between said fixed devices, and each mounted on a spring controlled carrier, the springs of which carriers force said lip blocks into yielding contact, substantially as set forth.

27. In an organized machine for forming brushes, in combination, a movable tube carrier or holder, means for imparting intermittent rotation to said carrier, a bristle holder in the vicinity of which said sockets carrying the tubes successively present and dwell, means for conveying tufts of bristles from said bristle to said tubes, and consisting of a fixed plate embodying a guide slot, a reciprocating lever having a slotted arm, the slot of which registers with said guide slot, a bristle carrier plate having a longitudinal slot and a key slot, a key stud, mounted on said fixed plate and entered in said key-slot, a stud extending through the guide slot, the lever slot and the slot of the bristle carrier plate, and provided with a finger, bristle carrying fingers pivotally mounted on said plate and geared together, one of said fingers being provided with a shank adapted to be encountered by the finger of the stud, substantially as set forth.

28. In an organized machine for forming brushes, in combination, a movable tube carrier or holder, means for imparting intermittent rotation to said carrier, a bristle holder in the vicinity of which said tubes successively present and dwell, means for conveying tufts of bristles from said bristle holder to said tubes, and consisting of a fixed plate embodying a curved guide slot, a reciprocating lever having a slotted arm, the slot of which registers with said guide slot, a bristle carrier plate having a longitudinal slot and a key slot, a key stud, mounted on said fixed plate and entered in said key-slot, a stud extending through the guide slot, the lever slot and the slot of the bristle carrier plate, and provided with a finger, bristle carrying fingers pivotally mounted on said plate and geared together, one of said fingers being provided with a shank adapted to be encountered by the finger of the stud, an ejector plate, the recessed outer end of which reciprocates in ways formed in the opposing faces of the fingers, and the inner end of which is connected to the stud, substantially as set forth.

29. In an organized machine for forming brushes, in combination, a movable tube carrier or holder, means for imparting intermittent rotation to said carrier, a bristle holder in the vicinity of which said sockets carrying the tubes successively present and dwell, means for conveying tufts of bristles from said bristle holder to said tubes, and consisting of a fixed plate embodying a guide slot, a reciprocating lever having a slotted arm, the slot of which registers with said guide slot, a bristle carrier plate having a longitudinal slot and a key-slot, a key-stud, mounted on said fixed plate and entered in said key-slot, a stud extending through the guide slot, the lever slot and the slot of the bristle carrier plate, and provided with a finger, bristle carrying fingers pivotally mounted on said plate and geared together, one of said fingers being provided with a shank adapted to be encountered by the finger of the stud, the other of said fingers being provided with a spring shank which by pressure against the rigid shank of the other finger tends to keep said fingers closed, substantially as set forth.

30. In an organized machine for forming brushes, in combination, a movable tube carrier or holder, means for imparting intermittent rotation to said carrier, a bristle holder in the vicinity of which said sockets carrying the tubes successively present and dwell, means for conveying tufts of bristles from said bristle holder to said tubes, and consisting of a fixed plate embodying a guide slot, a reciprocating lever having a slotted arm, the slot of which registers with said guide slot, a bristle carrier plate having a longitudinal slot and a key-slot, a key stud, mounted on said fixed plate and entered in said key-slot, a stud extending through the guide slot, the lever slot, and the slot of the bristle carrier plate, and provided with a finger, bristle carrying fingers pivotally mounted on said plate and geared together, one of said fingers being provided with a shank adapted to be encountered by the finger of the stud, the other of said fingers being provided with a spring shank which by pressure against the rigid shank of the other finger tends to keep said fingers closed, and an ejector plate, the recessed outer end of which reciprocates in ways formed in the opposing faces of the fingers, and the inner end of which is connected to the stud, substantially as set forth.

31. In an organized machine for making brushes, in combination, a rotatable tube carrier or holder, means for supplying tubes to said carrier, and for supplying said tubes with tufts of bristles, a pair of compressing dies, and means for causing the approach and recession of said dies, said dies being so located that the tuft provided handle tubes are in the movement of the carrier presented one by one between them, substantially as set forth.

32. In an organized machine for making brushes, in combination, a rotatable carrier or holder embodying sockets, means for inserting tubes in said socket, and for supplying said tubes with tufts of bristles, a pair of cutting blades, and means for causing the approach and recession of said dies, said dies being so located that the tuft provided handle
5 tubes are in the movement of the carrier presented one by one between them, substantially as set forth.

In testimony that I claim the foregoing as my invention I have hereunto signed my name this 28th day of January, A. D. 1898.

JOHN W. HOCKER.

In presence of—
F. NORMAN DIXON,
THOS. K. LANCASTER.